(No Model.)

W. P. PERRY.
VELOCIPEDE.

No. 415,790. Patented Nov. 26, 1889.

Witnesses:
Edgar A. Goddu
Frederick L. Emery

Inventor:
William P. Perry,
by Crosby & Gregory
Attys.

UNITED STATES PATENT OFFICE.

WILLIAM P. PERRY, OF WEST MEDFORD, MASSACHUSETTS.

VELOCIPEDE.

SPECIFICATION forming part of Letters Patent No. 415,790, dated November 26, 1889.

Application filed July 15, 1889. Serial No. 317,513. (No model.)

*To all whom it may concern:*

Be it known that I, WILLIAM P. PERRY, of West Medford, county of Middlesex, State of Massachusetts, have invented an Improvement in Velocipedes, of which the following description, in connection with the accompanying drawings, is a specification, like letters on the drawings representing like parts.

This invention has for its object to construct a velocipede the propelling-power of which is electricity.

My invention consists in the combination, with the driving wheel or wheels, a wheel or pulley engaging the rim of said driving-wheel, and an electric motor for driving said pulley, of a friction-clutch for transmitting the power of the motor to the pulley, and means, substantially as will be described, for moving said clutch; also, in the combination of the steering wheel or wheels and a friction pulley or pulleys engaging the rim thereof, an electric motor, and a clutch or clutches for transmitting the power to the said friction pulley or pulleys, and a brake; also, in the combination of two driving-wheels arranged on an axle or bar supported on a frame, and counterbalancing-weights for said frame.

Figure 1:
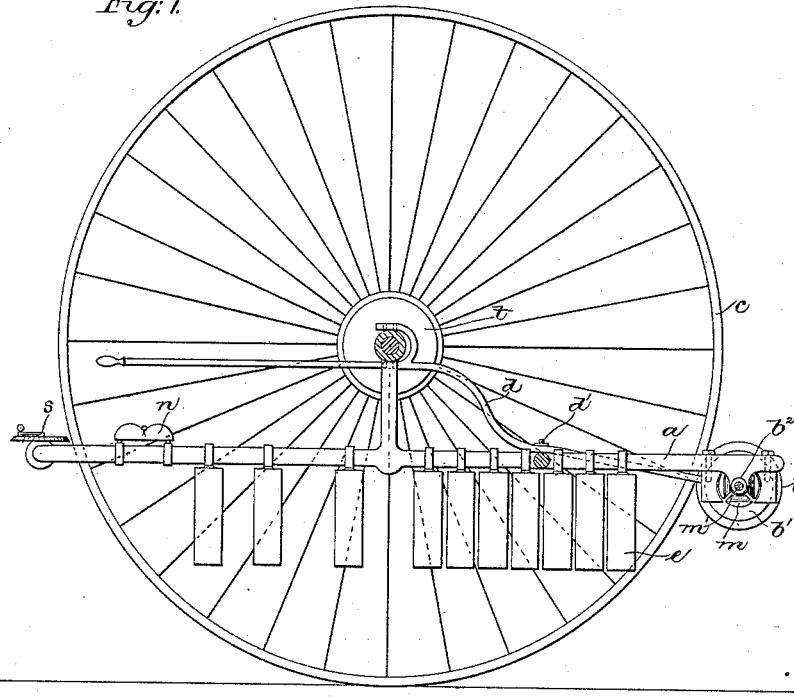
Figure 2:
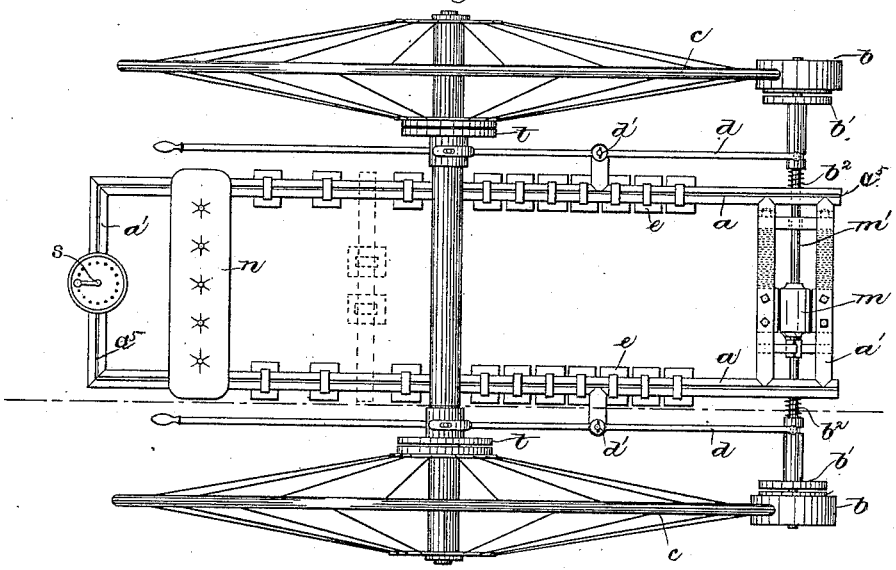

Figure 1 shows in side elevation a velocipede embodying this invention; Fig. 2, a plan view of the velocipede shown in Fig. 1.

The main frame-work consists of the side bars $a$ and end bars $a'$, preferably made tubular and slitted, as at $a^5$. On the transverse bars $a'$, at one end of the frame, an electric motor $m$ is supported, the shaft $m'$ of which has its bearings in the frame. On each end of the shaft $m'$ are loosely arranged pulleys $b$, which engage frictionally the rims of the driving-wheels $c$. Friction-plates $b'$ are also arranged on the shaft $m'$, which are moved longitudinally thereon by arms or levers $d$ into engagement with the wheels or pulleys $b$, said friction-plates serving as clutches and transmitting the power from the rotating shaft $m'$ to the pulleys. Spiral springs $b^2$ are arranged on the shaft $m'$, normally tending to force the friction-plates into contact with the wheels or pulleys $b$. The arms or levers $d$ are pivoted to the side bars at $d'$. Several cells of battery, as $e$, are hung or arranged on the side bars $a$ of the supporting-frame, from which a circuit, including the electric motor, leads, and a switch $s$ is provided for including additional cells of battery in the circuit when going uphill. A seat $n$ is arranged on the supporting-frame, and to counterbalance the weight of the rider most of the cells are arranged on that side of the axle-bar opposite the rider. Friction-plates $t$ are arranged and made movable longitudinally on the axle-bar and connected to the arms or levers $d$, by which they are moved, said plates when moved longitudinally or outwardly contacting with the drive-wheels and serving as brakes.

By the arrangement of parts herein described the driving-wheels are rotated by means of the friction pulleys or wheels $b$, which are driven by the electric motor supplied with power from the batteries.

I do not desire to limit my invention to the precise form of brake or clutch shown, as it is obvious that any other form may be used; also, it is obvious that the means herein shown for propelling the machine may be applied to a velocipede of any other form or construction. It is also obvious that but one pulley or wheel $b$ may be employed in lieu of two, as shown.

I claim—

1. A supporting-frame comprising side and end bars and driving-wheels, combined with an electric motor supported by the end bars at one extremity of the frame, the motor-shaft $m$, friction-pulleys loose thereon and contacting with the driving-wheels, and friction-clutches upon said shaft for transmitting power from the electric motor to the pulleys $b$, substantially as described.

2. A supporting-frame, axle-bar, and driving wheel or wheels thereon, and friction-plates $t$, movable longitudinally on said axle-bar, combined with pulleys continuously engaging the rims of said driving wheel or wheels, an electric motor, and clutches and hand-levers for moving them, and also connected to said plates $t$ to move them into contact with the driving-wheels to act as brakes, substantially as described.

3. A supporting-frame and driving-wheels, combined with loose pulleys continuously engaging the rims of said driving-wheels, an electric motor, its shaft, and clutches movable longitudinally thereon, and means for moving the clutches longitudinally to engage said loose pulleys, and the battery arranged on the sides of the supporting-frame, and a switch, substantially as described.

4. A supporting-frame, axle-bar, and driving-wheels thereon, combined with a seat arranged on said frame at one side of said axle-bar, and a battery arranged upon the sides of the supporting-frame at the opposite side of the axle to the seat to counterbalance the weight of the rider, substantially as described.

In testimony whereof I have signed my name to this specification in the presence of two subscribing witnesses.

WM. P. PERRY.

Witnesses:
BERNICE J. NOYES,
B. DEWAR.